United States Patent [19]

Frost

[11] Patent Number: 5,663,267

[45] Date of Patent: *Sep. 2, 1997

[54] RE-ENTERABLE ACRYLIC POLYMER GROUT MATERIAL

[75] Inventor: George W. Frost, Afton, Minn.

[73] Assignee: Minnesota Mining and Manufacturing Co., St. Paul, Minn.

[*] Notice: The term of this patent shall not extend beyond the expiration date of Pat. No. 5,387,661.

[21] Appl. No.: 707,026

[22] Filed: Sep. 10, 1996

Related U.S. Application Data

[63] Continuation of Ser. No. 499,754, Jul. 7, 1995, abandoned.

[51] Int. Cl.$^6$ .................. C08F 220/10; C08F 224/00; C08F 232/08; C08F 216/14
[52] U.S. Cl. .................. 526/328.5; 526/273; 526/282; 526/332
[58] Field of Search .................. 526/328.5, 273, 526/282, 332

[56] References Cited

U.S. PATENT DOCUMENTS

| | | | |
|---|---|---|---|
| 3,719,050 | 3/1973 | Asao et al. | 61/36 R |
| 3,985,588 | 10/1976 | Lyman | 148/103 |
| 4,197,225 | 4/1980 | Emmons et al. | 260/23 AR |
| 4,400,413 | 8/1983 | Emmons et al. | 427/136 |
| 4,463,117 | 7/1984 | Malin | 524/260 |
| 4,910,080 | 3/1990 | Frost | 428/307.3 |
| 4,910,255 | 3/1990 | Wakabayashi | 525/100 |
| 5,037,879 | 8/1991 | Roberts | 524/590 |
| 5,102,938 | 4/1992 | Roberts | 524/287 |
| 5,229,453 | 7/1993 | Roberts | 524/590 |
| 5,387,661 | 2/1995 | Frost | 526/328.5 |

FOREIGN PATENT DOCUMENTS

| | | |
|---|---|---|
| 0 145 685 | 6/1985 | European Pat. Off. . |
| 0 421 567 | 4/1991 | European Pat. Off. . |
| 0 619 348 | 10/1994 | European Pat. Off. . |
| 60120780 | 6/1985 | Japan . |
| 88/04675 | 6/1988 | WIPO . |

OTHER PUBLICATIONS

"Coatings Performance Materials Concrete Sealer Coating Formulation with Santolink® XI 100 Crosslinker–Initiator", Pub. No. 2029249.

Chemical Abstracts, vol. 103, No. 22, 2 Dec. 1985, abstract No. 179788, Mitsubishi Rayon.

*Primary Examiner*—Joseph L. Schofer
*Assistant Examiner*—Wu C. Cheng
*Attorney, Agent, or Firm*—Gary L. Griswold; Walter N. Kirn; Doreen S. L. Gwin

[57] ABSTRACT

A soil stabilization polymer grout composition comprising (a) a $C_8$ to $C_{10}$ alkyl ester of acrylic or methacrylic acid; optionally,(b) an ester of acrylic or methacrylic acid having a $T_g$ of greater than about 50° C.; (c) a crosslinking agent; and (d) a free-radical initiator. The composition when filled to provide a composite provides a hardened material which is re-enterable.

8 Claims, No Drawings

RE-ENTERABLE ACRYLIC POLYMER GROUT MATERIAL

This is a continuation of application Ser. No. 08/499,754, filed Jul. 7, 1995 now abandoned.

FIELD OF THE INVENTION

This invention relates to low viscosity soil stabilization polymer grout compositions that remain hand-breakable when mixed with filler and cured, so that the consolidated soil can be easily re-entered at a later date.

BACKGROUND OF THE INVENTION

Polymer grout compositions are often used to consolidate soils around underground structures like concrete tanks and pools, sewer pipes, gas and water mains, and manholes. Typically, cementitious, urethane, and acrylamide grouts provide strong, tough composities useful for this purpose, but the composite soil is very difficult to re-enter or to break up if one needs to move or dig into the area. Recently, there has been increased interest in using polymer grout compositions as part of the closure system of shallow subsurface structures for disposal of solid wastes. In this application, the grout must be of sufficiently low viscosity that it can be applied by injection or gravity feed, and should provide good water and chemical resistance to the consolidated waste area, but the consolidated structure should also be friable so that it can be readily re-entered and broken up at a later date for inspection or removal of the wastes to an alternate disposal site.

Polyurethane prepolymer compositions have long been used for soil consolidation and as grouts for sealing structures. U.S. Pat. No. 3,985,588 to Speech is directed to a foam polyurethane grout that is typically pumped into a sewer line to seal joints. U.S. Pat. No. 3,719,050 to Asao, et. al, describes a polyurethane prepolymer composition that is a gel rather than a foam. A chemical soil consolidation composition utilizing a water immiscible solvent is "Scotch-Seal 5620"Chemical Grout, commercially available from 3M Company, St. Paul, Minn., which is an 80% polyurethane prepolymer in butyl benzyl phthlate. This composition has a high initial viscosity (about 6,000 centipoise), but has a low viscosity when mixed with water at about a 10:1 to 20:1 water/composition ratio to allow good soil penetration. Because of the high initial viscosity, this composition is not easily pumpable through standard grout pumping equipment and thus cannot be used for many injectable applications. U.S. Pat. Nos. 5,037,879, 5,102,938, and 5,229,453 to Roberts describe alternate polyurethane prepolymer systems that react with water to produce a gel for use in sealing water containing structures and soil stabilization.

Urethane-based grout systems typically do not weather well and break down when exposed to ultra violet radiation, acid solutions, strong organic solvents, and radioactive environments. They also typically shrink as they dry out and often give a porous structure that does not provide adequate protection against water penetration in waste sites. They also have fast gel times, typically only a few minutes, and thus are not suitable for deep penetration applications. The present invention provides an alternate polymer grout composition that is, in a preferred embodiment, of low viscosity so that it is easily injectable, is durable and imparts good water and chemical resistance to the consolidated soil area, and remains hand-breakable after curing so that the consolidated soil can be re-entered at a later date.

SUMMARY OF THE INVENTION

The present invention provides a novel low viscosity, re-enterable polymer grout composition comprising:

(a) about 70 to about 98 parts by weight of a $C_8$ to $C_{18}$ alkyl ester of acrylic or methacrylic acid;

(b) 0 to about 25 parts by weight of an ester of acrylic or methacrylic acid having a $T_g$ of greater than about 50° C.;

(c) about 2 to about 40 parts by weight of a crosslinking agent polymerizable with components (a) and (b); and (d) a free-radical initiator for polymerizing components (a), (b) and (c);

such that when the composition is tested in accordance with the Hand-breakability Test Method described below, the cured, filled composition is hand-breakable. Preferably, the cured, filled composition is breakable without use of mechanical leverage and most preferably is friable so that it can be easily crumbled by hand.

A promoter may also be added to promote decomposition of peroxide and/or to facilitate reaction of sites of vinyl unsaturation in the crosslinker.

The filler may include powder or granular aggregate, such as sand or clay, and the polymer composition is preferably added so that the filler is saturated, filling any void volume between the filler particles.

Preferred compositions of the invention prior to inclusion of any filler and subsequent cure exhibit a viscosity of less than 100 cps, preferably less than 50 cps, and most preferably less than 20 cps.

The preferred compositions of the invention have low viscosities and sufficiently long gel times that allow for deep, broad, liquid solution penetration by injection or gravity forces, and are useful in the consolidation or stabilization of soil, and remain hand-breakable, and preferably friable after aging to permit re-entry into the stabilized soil.

DETAILED DESCRIPTION

Examples of suitable acrylic acid or methacrylic acid esters for use as component (a) of the composition include the esters of acrylic acid or methacrylic acid with $C_8$ to $C_{18}$ alcohols. Suitable esters meeting the foregoing definition are stearyl methacrylate, lauryl acrylate, and lauryl methacrylate. Specific examples of preferred esters are $C_8$ to $C_{10}$ alkyl esters such as iso-octyl acrylate, 2-ethyl hexyl acrylate, and iso-decyl methacrylate.

Another monomer (b) may be included in the composition to make the polymer grout more water insensitive. Examples of suitable monomers for use as component (b) of the compositions of the invention have a $T_g$ greater than about 50° C. and have no polymerizable sites of unsaturation other than the single acrylate or methacrylate moiety. Specific examples of suitable monomers are hydroxypropyl methacrylate, hydroxyethyl methacrylate, isobornyl methacrylate, methyl methacrylate, dimethylaminoethyl methacrylate and glycidyl methacrylate.

The compositions of the invention also include a crosslinking agent (c) which preferably is polyacrylic, polyallylic or has one acrylate or methacrylate moiety and one vinyl site (other than the site of α, β-unsaturation contained in the acrylate or methacrylate moiety). A crosslinking agent facilitates rapid cure of the composition, preferably in less than about 12 hours at 20° C., and enhances friability of the cured, filled composite. Examples of preferred crosslinkers are selected from the group consisting of a polyallyl glycidyl ether resin, dicyclopentyl ethoxy methacrylate, allyl methacrylate, dicyclopentyl acrylate, dicyclopentyl methacrylate, trimethanol propane triacrylate (TMPTA), and trimethanol propane diacrylate (TMPDA).

Monomer components (a), (b), and (c) will be present in amounts of about 70 to about 98 parts, 0 to about 25 parts, and about 2 to about 40 parts by weight, respectively, based on 100 parts by weight of the total amount of the polymerizable monomer components (i.e., components (a), (b), (c) and any other polymerizable component which may be present). Preferably, component (a) will be present in an amount of about 80 to 90 parts by weight, (b) will be present in an mount of about 5 to about 10 parts by weight, and component (c) will be present in an amount of about 5 to about 10 parts by weight per 100 parts by weight of the total amount by weight of the polymerizable monomer components (i.e., components (a), (b), (c) and any other polymerizable component which may be present).

The free radical initiator that may be used in the composition of this invention as component (d) is any polymerization agent that will furnish free radicals under polymerization conditions. The initiator is used in an amount effective to produce substantially complete polymerization of the polymerizable components (i.e., components (a), (b), (c) and any other polymerizable component which may be present) at ambient temperature within less than about 24 hours. Preferably, the free radical initiator is present in an amount that is about 0.05 to 5 parts by weight per 100 parts by weight of the total amount of polymerizable components. Particularly preferred initiators are organic peroxy compounds such as benzoyl peroxide and cumene hydroperoxide. The free radical initiator may be a photoinitiator, which is an agent that is sensitive to ultraviolet light as would be provided in sunlight or in UV lamps. Examples of such a photoinitiator are acetophenones, such as 2,2-dimethoxy-2-phenylacetophenone (commercially available as Irgacure 651 from Ciba-Geigy Corp., Hawthorne, NY) and diethoxyacetophenone; benzil; and benzoin ethers.

The composition of the invention may contain mixtures of two or more different free radical initiators. For example, both an organic peroxy compound and a photoinitiator may be utilized to provide a rapid cure with particularly rapid cure of the outermost layer of the coating from exposure to light.

A promoter as component (e) is preferably also incorporated in the composition to allow cure to occur at lower temperatures. Preferred promoters include a metal salt promoter, which catalyzes the oxidative reaction of the site of vinyl unsaturation in component (c), or an organic amine promotor such as N-ethyl-N-hydroxyethyl-M-toluidine, N,N-Diethyl-m-toluidine, or N,N-dimethyl-analine, which promotes breakdown of peroxide. Component (e) if employed should be present in an amount effective to enhance speed and completeness of cure of the composition. Thus, when only a photoinitiated free radical initiator is utilized, the incorporation of the promoter is particularly desirable to assure complete cure of the composition throughout the consolidated structure. When the free radical initiator is an organic peroxide, the additional use of the promoter is desirable to provide a more rapid cure of the polymer than would be possible in the absence of the promoter. Typically, the promoter is present in the composition at about 0.0005 to 2 parts by weight per 100 parts by weight of the total amount of the polymerizable components.

When the composition of the invention is stored in the presence of a metal salt promoter, the compositions may also contain a volatile reaction inhibitor to prevent premature polymerization of the polymerizable components before application to the desired substrate. Because these inhibitors are volatile, they dissipate in the air upon application of the composition to the substrate and no longer inhibit the polymerization reaction. Preferred inhibitors include volatile oximes such as methylethyl ketone-oxime, methylbutyl ketone-oxime, 5-methyl-3-heptanone-oxime, cyclohexanone-oxime and butyraldehyde-oxime. Volatile reaction inhibitors are present in an effective amount, preferably in amounts of about 0.01 to 2 parts by weight per 100 parts by weight of the total amount of the polymerizable components.

Preferred compositions of the invention prior to inclusion of any filler and subsequent cure exhibit a solution viscosity of less than 100 cps, preferably less than 50 cps, and most preferably less than 20 cps. Solution viscosities as referenced throughout the instant specification and claims are determined at 20° C. with a Brookfield™ Viscometer using the ultralow viscosity adaptor kit and operated at 100 rpm.

The polymer grout compositions of the present invention are typically mixed with at least about 100 parts by weight filler per 100 parts by weight of the total amount of polymerizable components in the composition. Suitable fillers which may be employed in the compositions of the present invention are well known to those skilled in the art and include conventional materials ranging from powders to granular aggregate. Examples of suitable fillers are pebbles, sand or other large and small aggregates used in preparing concrete. Other generally high modulus inorganic silicaneous materials such as clay or soil may be employed. Still further, examples of suitable fillers are glass bubbles or beads, colorquartz, carbon black, pigments and fumed silica. Preferably the filler will have a void volume of less than about 35%.

Typically, the filler will be present in an amount of at least 100 parts by weight, preferably about 200 to 2000 parts by weight, and most preferably about 300 to 500 parts by weight per 100 parts by weight of the total amount of the polymerizable components.

The composition of the present invention may additionally comprise further additives, such as coloring agents, stabilizers, thickeners, rheological modifiers, preservatives or anticorrosive agents.

The composition of the present invention is typically provided as a three-part mixture comprising components (a), (b), if employed, and (c) in the indicated ratios in one container, the promoter (e), if employed in a second container, and the free radical initiator (d) in a third container. The free radical initiator should not be combined with the promoter without components (a), (b) and (c) present due to the violent reaction that would ensue. Alternatively, this composition may be provided as a two-part system. In such a system, the components (a), (b), if employed, and (c) are provided in one container, optionally together with the promoter (e) and a stabilizer. The free radical reaction initiator (d) is provided in a second container and is mixed together with monomer components (a), (b), if employed, and (c), and the promoter (e), if employed, at the site of application together with any filler. Alternately, to eliminate any addition of components at the time of application, the composition may be provided as a two part system having half of the monomer blend (including (a), (b), if employed, and (c)) combined with a double charge of initiator, and the other half of the monomer blend combined with a double charge of promoter. The two parts are then mixed together to give the proper dosage of initiator and promoter and the composition can be immediately injected or mixed with filler.

Hand-breakability of the polymer grout compositions of the invention for purposes of construing the scope of the instant claims is determined by mixing only that amount of polymerizable grout composition with an amount of silica sand (30–80 mesh) to saturate or fill the void volume of the silica sand with no excess polymerizable grout composition remaining.

The mixture prepared above is then fabricated as 4×6×⅜ inch specimens and is cured for 18 hours at 22° C. A grout composition of the invention when tested as above provides a specimen which is hand-breakable in the sense that a bending motion achieved using two hands would result in breakage into at least two pieces (without employment of any impact force). The degree of hand-breakability may be further rated in terms of relative ease as follows: breakable by hand with the aid of additional mechanical leverage (i.e., provided by a table edge); breakable by hand without additional mechanical leverage; or friable and hand-crushable. This test method is denoted as the "Hand-breakability Test Method" in the instant claims.

In the following examples, all compositions are reported in parts by weight per 100 parts of the total polymerizable components.

EXAMPLE 1

Three component monomer blends were prepared from iso-octyl acrylate, IOA, hydroxypropyl methacrylate, HPMA, (BM 955, obtained from Rohm Tech, Inc., Malden, Md.), and trimethanol propane triacrylate, TMPTA, (TMPTA, obtained from Radcure Specialties, Inc., Louisville, Ky.). The proportions that were blended and mixed are shown in TABLE 1 below. To begin curing, benzoyl peroxide initiator, BPO, (Cadox BFF-50, obtained from Akzo Chemie America, part of Noury Chemicals, Chicago, Ill.) was dissolved in 100 grams of each monomer blend, and an amine promoter, N-ethyl-N-hydroxyethyl-M-toluidine, TOLUIDINE, (Emery 5714, obtained from Henkel Organic Products Group, Emery Chemical Division, Cincinatti, Ohio) was added to the blend as indicated in TABLE 1.

The cure times at 22° C. were determined for the neat blend by recording the time at which the composition was no longer pourable. The cure times in minutes are given in TABLE 2. The compositions all remained somewhat flexible after curing, but the physical strength of each cured neat composite was evaluated and rated as (S), strong and difficult to flex; (M), medium strength and flexible; or (W), weak and taffy-like. The flexibility ratings for each cured neat composition are given in TABLE 3.

Thirty-three (33) grams of the neat composition was then mixed with 67 grams of clay soil to form a saturated soil slurry, and the cure time in minutes was again recorded as shown in TABLE 2. All cured filled composites were hand-breakable in the spirit of the instant invention, and therefore would be acceptable as re-enterable grout materials. The relative ease in hand-breakability was rated as (D), breakable by hand using mechanical leverage; (E), breakable by hand without additional mechanical leverage; and (F), friable and hand-crushable. The ease of hand-breakability for each cured, filled composite is given in TABLE 3.

TABLE 1

Polymer grout compositions

| Components | 1 | 2 | 3 | 4 | 5 | 6 | 7 | 8 | 9 |
|---|---|---|---|---|---|---|---|---|---|
| IOA | 70 | 75 | 75 | 80 | 80 | 85 | 85 | 90 | 90 |
| HPMA | 13 | 15 | 5 | 10 | 5 | 10 | 5 | 5 | 5 |
| TMPTA | 17 | 10 | 20 | 10 | 15 | 5 | 10 | 5 | 5 |
| BPO | 2.5 | 2.5 | 2.5 | 2.5 | 2.5 | 2.5 | 2.5 | 2.5 | 2.0 |
| Toluidine | 0.2 | 0.2 | 0.2 | 0.2 | 0.2 | 0.2 | 0.2 | 0.2 | 0.2 |

TABLE 2

Cure times (minutes at 22° C.)

| Sample | 1 | 2 | 3 | 4 | 5 | 6 | 7 | 8 | 9 |
|---|---|---|---|---|---|---|---|---|---|
| Neat | 10 | 10 | 10 | 10 | 10 | 10 | 15 | 15 | 40 |
| 67% Clay Composite | 15 | 15 | 15 | 20 | 15 | 20 | 15 | 25 | — |

TABLE 3

Physical strength and degree of flexibility

| Sample | 1 | 2 | 3 | 4 | 5 | 6 | 7 | 8 | 9 |
|---|---|---|---|---|---|---|---|---|---|
| Neat | S | M | S | M | S | W | M | W | W |
| 67% Clay Composite | D | E | D | E | D | F | E | F | F |

EXAMPLE 2

Alternate monomers that may be used for lower odor, lower viscosity, etc. were blended and evaluated as described in Example 1. Lauryl acrylate, LA, (Rocryl 320, obtained from Rohn & Haas Co., Philadelphia, Pa.) was evaluated as an alternate to IOA, and isobornyl methacrylate, IBMA, (423A, obtained from Sartomer Co., Exton, Pa.) was evaluated as an alternate to HPMA. The monomers were blended in the proportions indicated in TABLE 4. 15 grams of the neat polymer compositions were then mixed with 85 grams of silica sand (30–80 mesh) to form a saturated slurry which was then cured for 18 hours at 22° C. The cure times of the neat compositions and sand-filled polymer composites are given in TABLE 5, and the physical strength and ease of hand-breakability ratings for the neat compositions and sand-filled polymer composites, respectively, are given in TABLE 6.

EXAMPLE 3

The effect of initiator and promotor level on cure times was determined for the neat samples using a full factorial central composite design. A monomer blend was made according to sample 9 in Example 1, with 90 parts IOA, 5 parts HPMA, and 5 parts TMPTA. The level of BPO initiator and amine promotor were varied as indicated in TABLE 7 to give a high, low and center point, with the amount of each given as parts per hundred parts of monomer blend. The results of this experiment show that the cure time can be adjusted from 22 to 65 minutes for variations in the work life, application time, and penetration time. Within the levels of initiator and promoter shown, the physical properties are insensitive to the cure time.

TABLE 4

Additional polymer grout compositions

| Components | 11 | 12 | 13 |
| --- | --- | --- | --- |
| IOA | 90 | — | 90 |
| LA | — | 90 | — |
| HPMA | 5 | 5 | — |
| IBMA | — | — | 5 |
| TMPTA | 5 | 5 | 5 |
| BPO | 2.5 | 2.5 | 2.5 |
| Toluidine | 0.5 | 0.5 | 0.5 |

TABLE 5

Cure time (min. at 22° C.)

| Sample | 11 | 12 | 13 |
| --- | --- | --- | --- |
| Neat | 20 | N.C. | 25 |
| 85% Silica Sand | 20 | 90 | 25 |

N.C. indicates no cure within 18 hours

TABLE 6

Physical strength/degree of friability

| Sample | 11 | 12 | 13 |
| --- | --- | --- | --- |
| Neat | W | W | W |
| 85% Silica Sand | F | F | F |

TABLE 7

Cure time in minutes at 22° C.

| | Peroxide | | |
| --- | --- | --- | --- |
| amine | 1.3 phm | 2.5 phm | 3.7 phm |
| 0.15 phm | 65 | — | 22 |
| 0.30 phm | — | 22 | — |
| 0.45 phm | 22 | — | 22 |

What is claimed is:

1. A polymer grout composition comprising:
   (a) about 70 to about 98 parts by weight of a $C_8$ to $C_{18}$ alkyl ester of acrylic or methacrylic acid;
   (b) 0 to about 25 parts by weight of an ester of acrylic or methacrylic acid having a $T_g$ of greater than about 50° C.;
   (c) about 2 to about 40 parts by weight of a crosslinking agent polymerizable with components (a) and (b); and
   (d) a free-radical initiator for polymerizing components (a), (b) and (c);

wherein said composition is hand-breakable when tested in accordance with a Hand-breakability Test Method.

2. A composition according to claim 1, wherein monomer (a) is selected from the group consisting of iso-octyl acrylate, iso-decyl methacrylate, stearyl methacrylate, lauryl acrylate, 2-ethylhexyl acrylate, and lauryl methacrylate.

3. A composition according to claim 1, wherein monomer (b) is selected from the group consisting of hydroxypropyl methacrylate, hydroxyethyl methacrylate, isobornyl methacrylate, dimethylaminoethyl methacrylate, and methyl methacrylate.

4. A composition according to claim 1, wherein said crosslinking agent is polyacrylic, polyallylic, or contains one acrylate or methacrylate moiety and one site of vinyl unsaturation.

5. A composition according to claim 4, wherein said crosslinking agent is selected from the group consisting of pollyallyl glycidyl ether resin, dicyclopentyl ethoxy methacrylate, allyl methacrylate, dicyclopentyl acrylate, dicyclopentyl methacrylate, trimethanol propane triacrylate, and trimethanol propane diacrylate.

6. A composition according to claim 4, wherein said composition further comprises a promoter (e).

7. A composition according to claim 1, wherein monomer component (a) is present in an amount of about 80 to 90 parts by weight, monomer component (b) is present in an amount of about 5 to 10 parts by weight, and crosslinker (c) is present in an amount of about 5 to 10 parts by weight, all per 100 parts by weight of the total amount of polymerizable components; initiator (d) is present in an amount of about 1 to about 5 parts by weight per 100 parts by weight of the total amount of polymerizable components; and promoter (e) is present in an amount of about 0.1 to about 0.5 parts by weight per 100 parts by weight of the total amount of polymerizable components in said composition.

8. A hardened article fabricated from a composition according to claim 1 combined with at least 50% filler.

* * * * *